US007587325B1

(12) United States Patent
Scott

(10) Patent No.: US 7,587,325 B1
(45) Date of Patent: Sep. 8, 2009

(54) METHOD OF INSURING AGAINST SATELLITE LAUNCH FAILURE

(76) Inventor: David R. Scott, 6033 W. Century Blvd., Suite 400, Los Angeles, CA (US) 90045

( * ) Notice: Subject to any disclaimer, the term of this patent is extended or adjusted under 35 U.S.C. 154(b) by 706 days.

(21) Appl. No.: 09/713,965

(22) Filed: Nov. 15, 2000

(51) Int. Cl.
*G06Q 40/00* (2006.01)
*B64G 1/10* (2006.01)
*B64G 1/64* (2006.01)

(52) U.S. Cl. .................. 705/4; 244/158.6; 244/172.5
(58) Field of Classification Search ............. 244/158.6, 244/172.5
See application file for complete search history.

(56) References Cited

U.S. PATENT DOCUMENTS 5,806,802 A * 9/1998 Scott .......................... 244/161
6,017,000 A * 1/2000 Scott ....................... 244/158 R
6,550,720 B2 * 4/2003 Fleeter et al. ............. 244/158.7

OTHER PUBLICATIONS

Arlen Large, Space Insurance Industry is Seeking Greater Says in Satellite Technology, Jun. 21, 1984, Wall Street Journal, p. 1.*
Insurance Firms Hire NASA to Find Two Lost Satellites, Wall Street Journal, Oct. 23, 1984, p. 1.*
L.H. Otis, Insured Satellite 'Reboost' is a First, National Underwriter, vol. 95, issue 16, Apr. 1991, pp. 7-9.*
Susana Schwartz, Are you prepared for disaster?, Insurance and Technology, Apr. 1997, vol. 22, issue 4, pp. 34-37.*
James R Dukart, GSA Extends, expands satellite communications contract, Signal, Apr. 2000, vol. 54, issue 8, p. VG8.*
Used satellites, anyone? International Insurance Monitor, Dec. 1984, vol. 38, issue 8, pp. 4-7.*
Report by the UNCTAD Secretariat, Legal and Documentary Aspects of the French and Latin American Marine Insurance Legal Regimes, UN Conference on Trade and Development, published by the United Nations, 1983.*
Lavernhe, JP, Ivanoff, S., Abstract, Medical assistance to travellers: a new concept in insurance-cooperation with an airline, Aviat Space Environ Med., Apr. 1985.*
Reuters, "Insurers and Malaysian authorities argue over raising of wrecked liner"; Journal of Commerce. New York: Jun. 1, 1999. p. 14.*
L.H. Otis, "Insured Satellite 'Reboost' is a First," National Underwriter, vol. 95, issue 16, Apr. 1991, pp. 7-9.*
Stacy Shapiro; "Abundance of Capacity Reducing Satellite Rates," Business Insurance, May 5, 1997, vol. 31, No. 18, p. 32.*
Anonymous, "Insurance Firms Hire NASA to Find Two Lost Satellites", The WallStreet Journal, Oct. 23, 1984, p. 1.*

* cited by examiner

*Primary Examiner*—C. Luke Gilligan
*Assistant Examiner*—Rachel L Porter
(74) *Attorney, Agent, or Firm*—David G. Duckworth; Russo & Duckworth LLP

(57) ABSTRACT

A method of insuring against launch failure is provided to reduce the business risk to the satellite owner and insurance underwriters against satellite launch failure. The launch insurance includes provision for guaranteeing a rapid response recovery mission, preferably at no cost, in the event that a satellite suffers a boost failure during launch resulting in a fully-functional satellite being launched to an unintended inoperable orbit. Preferably, the launch insurance also provides for additional insurance against failure of the recovery mission to provide compensation to the satellite owner in the event that the recovery mission is also unsuccessful.

3 Claims, 8 Drawing Sheets

METHOD OF INSURING AGAINST SATELLITE LAUNCH FAILURE

BACKGROUND OF THE INVENTION

The present invention relates to methods of insuring against satellite failure. More particularly, the present invention relates to methods of obtaining insurance and protection against the launch of satellites into unintended non-operational Earth orbits.

The manufacture of communications, Earth observation, navigation and science satellites is experiencing a period of extraordinary growth that is expected to continue into the future. Present estimates indicate that approximately 70 large satellites are projected to be launched into earth orbit each year during the next ten years for both commercial and government uses resulting in almost 700 new Earth orbiting satellites. The satellites continue to increase in size, complexity and cost and with the increased number of satellites being produced, the satellite industry is estimated to obtain revenues of $171 billion in the year 2007.

The launch phase of a satellite deployment into orbit includes two basic steps performed in sequence. First, the satellite is launched from the Earth's surface through the atmosphere into space to a transfer orbit. Secondly, the satellite is transferred to a higher orbit, typically geosynchronous orbit. The first segment is typically conducted by a launch vehicle such as the Space Shuttle, Titan, Delta, Atlas, Arian, Long March or Proton rockets. Meanwhile, the second segment is typically performed by a transfer vehicle which may comprise the upper stage of the rocket or may comprise a perigee kick motor (PKM) or apogee kick motor (AKM) attached to the satellite. The launch phase is then considered complete when the satellite is separated from the transfer vehicle.

Unfortunately, a significant percentage of satellites fail due to their failure to reach their intended orbit or due to their failure to operate correctly once in orbit. In November 1992, a "90-day satellite salvage study" was conducted jointly by NASA and the International Technology Underwriters, Inc. (INTEC) to identify the commercial risk allocation due to satellite failure. The study evaluated the historical failure statistics of 328 large satellites having an on orbit replacement value of $170 million or greater which were launched between 1980 and 1992. Though this study was conducted several years ago, recent research indicates that the applicable percentages have not changed significantly over the past decade. Among the 328 satellites studied, 64 experienced some form of total or significant failure resulting in total loss as reflected in the table below.

Type Failure (328 launches)

|  | Number | Percent of Total |
|---|---|---|
| Ascent to LEO ("launch failure") | 21 | 6.4 |
| LEO to higher orbit ("Boost Failure") | 13 | 4.0 |
| Satellite during Checkout (C/O Failure) | 19 | 5.8 |
| Satellite during Operations (Ops Fail) | 11 | 3.4 |
| Successful | 264 | 80.5 |
| Total | 328 | |

This study reflects that of the 328 satellites, 34 (10.4%) of all large geostationary satellites that have been declared a total loss have been lost during the "launch phase" with the remaining satellite total losses occurring during on orbit check out or during subsequent lifetime operations. The risk of total loss of a satellite during the launch phase can be divided into two categories. The first category includes satellites that have suffered catastrophic failure of the launch vehicle accounting for 6.4% of all total losses. The second category, called "boost failure", includes the total losses of satellites caused by the failure of the satellite to reach its intended orbit due to degraded performance of the launch vehicle or transfer vehicle, accounting for 4.0% of all total losses. Thus, in numerous instances, fully functional satellites are declared a total loss because the satellites have failed to reach their intended orbits. Assuming that this pattern continues, which it has for almost forty years, and assuming that 700 new Earth orbiting satellites will be launched in the next ten years, approximately 28 satellites will be launched (or 2.8 satellites per year) in the next ten years which are fully functional but will result as a total loss due to their inability to operate in an incorrect orbit.

If insured, the total sum of the spacecraft loss including launch expenses is paid by the insurance underwriters, typically $250 million or more for each failure. However, the primary business loss of a launch failure is usually the long delay in obtaining a new or replacement satellite which can take up to two to three years. This delay in obtaining a replacement satellite can cause the total loss of a planned business due to competition and market changes during the interim.

Attempts have been made to "recover" a few of these fully functional satellites in inoperable orbits. For example, after the Weststar 6 and Palapa B2 satellites were launched to a low Earth orbit instead of geosynchronous orbit due to failure of their solid rocket motors to properly fire, the satellites were retrieved in the Space Shuttle. The satellites were then refurbished on Earth and relaunched into correct orbits where they became fully functional. Meanwhile, Intelsat VI, a very large satellite intended for geosynchronous orbit, was inadvertently launched to a low Earth orbit due to miswiring between the satellite and its attached solid rocket motor. The Space Shuttle performed a recovery mission in which three astronauts conducted a complex extra vehicular activity (EVA) in order to remove the inoperable solid rocket motor and substitute it with a functional solid rocket motor. Thereafter, the solid rocket motor was remotely fired and transported the Intelsat 6 satellite to the correct orbit where the satellite was fully functional. Unfortunately, Shuttle launch and operations including EVA activities are very dangerous and extremely expensive.

Recently, an attempt has been made to overcome these risks to human life and high expenses by the development of a recovery mission wherein a remotely controlled extension spacecraft is made to attach to the satellite located in the unintended orbit. Using the guidance, navigation, control and propulsion systems of these extension spacecraft, the satellite is transported to its intended orbit. A complete description of this recovery mission is described in U.S. Pat. No. 6,017,000 which is incorporated herein by reference. The use of an extension spacecraft to move a satellite to its intended orbit is substantially less expensive than manned Space Shuttle missions which typically cost about $400-$500 million, and substantially less than the cost of manufacturing and launching a replacement satellite which typically cost between $250 million and $1.2 billion, as in the case of AF Milstar 2. However, the cost for the manufacture, launch and operation of the extension spacecraft to correct the satellite's orbit still costs $100 million.

Due to the high expenses and risks involved in attempting to recover a satellite, numerous satellites have been declared a total loss due to their launch to an inoperable orbit even though the satellite is fully functional. For example, since 1993 each of the following ten satellites could have been recovered by the Space Shuttle or by the use of an extension spacecraft.

Recent Recoverable Satellites

| Satellite | Launch Vehicle | Boost Failure | Cost/Loss Claims |
|---|---|---|---|
| Navy UHF-1 | Atlas 1 | March 1993 | $187M |
| Japan ETS-6 | H-2 AKM | April 1994 | $425M |
| Koreasat-1 | Delta II | June 1995 | $64M |
| ChinaSat-7 | Long March 3 | June 1996 | $128M |
| AsiaSat-3 | Proton/DM | December 1997 | $220M |
| Japan COMETS | Japanese H-2 | January 1998 | $480M |
| AF DSP-19 | Titan IV/IUS | April 1999 | $682M |
| AF Milstar 2 | Titan IV/Centaur | April 1999 | $1,233M |
| Orion 3 | Delta III/Centaur | May 1999 | $265M |

There is thus a significant need for a system that would reduce the risk to satellite owners of their satellite being launched into an incorrect orbit resulting in the total loss of the spacecraft or the high expenses of a recovery mission.

One way to reduce the risk of total loss of a satellite is to obtain conventional launch insurance. Typically conventional launch insurance is implemented as follows. First, a satellite owner determines the amount of insurance to be purchased for the satellite launch referred to herein as the "sum insured". The sum insured may include just the cost to manufacture the satellite, but typically also includes the launch costs as well as the cost of insurance for the satellite and launch. Once the sum insured has been determined, an insurance broker attempts to obtain insurance coverage from a number of underwriters in the market, while at the same time attempting to obtain the lowest premium rate for his client. The underwriter establishes a premium rate for the satellite launch as a measure of the risk of launch. The premium rate may be a total percentage value of the sum insured incorporating the risks for various aspects of launch such as the risk of launch vehicle failure, boost failure, spacecraft failure at checkout and spacecraft failure during operations. In the alternative, the rate can be divided into separate categories. For example, the risk of launch can be divided into specific risks of launch failure and boost failure. The cost to the spacecraft owner of the insurance is thus a product of the sum insured times the total premium rate. This premium payment is paid by the satellite owner to the broker who typically separates the payment into two segments representing the payment insuring against launch vehicle failure and boost failure. The premium payment is then proportionally distributed to the several underwriters according to the amount of risk assumed by each. In the event of a launch failure, the underwriters are obligated to pay the total loss (sum insured) to the owner who may the use these proceeds to manufacture and launch a replacement satellite. Similarly, in the event of a boost failure, the underwriters are also obligated to pay the total loss (sum insured) to the owner who may the use these proceeds to manufacture and launch a replacement satellite. For purposes herein, the insurance broker and underwriters will be collectively referred to herein as a guarantor.

Unfortunately, conventional launch insurance does not assist in rescuing a satellite which is otherwise fully functional but placed in an unintended orbit during a boost failure.

SUMMARY OF THE INVENTION

The present invention addresses the aforementioned disadvantages by providing an improved method of insuring against satellite failure wherein the insurance policy provides for the funding and initiation of a recovery mission to recover an orbiting satellite if it has been determined that the satellite is otherwise fully functional but non-operational due to its accidental placement in a non-operational orbit. More particularly, after contracting for the manufacture of a satellite, the satellite owner includes in a conventional insurance policy from a guarantor an additional provision to provide for a recovery mission in the event that the satellite is ultimately launched into an unintended non-operational orbit but the satellite is otherwise fully functional.

The recovery mission provides for moving the satellite by external physical manipulation of the satellite from its resulting launch orbit to an intended operational orbit. The satellite may be moved by implementing various types of recovery missions. For example, the satellite may be recovered in similar manner to the recovery of the Weststar 6 and Palapa B2 satellites by recovering the satellite in the Space Shuttle and thereafter relaunching the satellite to its intended orbit by using an additional launch vehicle. Alternatively, the recovery mission may entail attachment of a booster vehicle to the satellite and thereafter igniting the booster vehicle to transfer the satellite from its unintended orbit to an intended orbit in similar manner to the reboost of the Intelsat VI satellite.

Preferably, the recovery mission includes launching an unmanned extension spacecraft to mechanically connect to the target satellite and thereafter move the satellite-spacecraft combination to its desired orbit. To perform the recovery mission, the extension spacecraft includes guidance, navigation and control systems, an onboard propellant supply and a docking system for mechanically connecting the extension spacecraft to the target satellite to form a docked satellite-spacecraft combination. The guidance navigation and control systems of the extension spacecraft provide the means for controlling the position of the docked satellite-spacecraft combination. Meanwhile, the extension spacecraft is provided with sufficient propellant supply to provide for rendevous and docking of the extension spacecraft with the target satellite and for subsequently transferring the satellite-spacecraft to its intended orbit.

In a preferred embodiment, the launch insurance of the present invention also includes insuring against failure of the recovery mission. To this end, the satellite owner or original guarantor obtains an insurance policy from providing protection against failure of the recovery mission to properly move the satellite from an unintended non-operational orbit to an intended orbit. The insurance policy includes the coverage for the additional risk of rendezvous, docking and transfer of the satellite, and preferably provides for monetary compensation to cover the original sum insured for the total loss of the satellite including compensation for payment of the satellite and its launch. In the alternative, the recovery mission failure insurance policy may also provide for funding and initiating an additional recovery mission where feasible.

Thus, the method of insuring against satellite failure of the present invention includes "recovery reservations" to safe guard against a launch boost failure. The "reservation" entitles the satellite owner to a fully insured Recovery Mission at no additional cost and no additional insurance premium. In operation, after purchasing a satellite, the satellite owner then consults with satellite guarantors including insurance brokers and underwriters to obtain this safeguard against accidental launch of a functioning satellite into an unintended non-operational orbit. The insurance policy may also include provisions for compensation to the satellite owner to cover other contingencies such as catastrophic loss of the spacecraft during launch, check out or operations.

Once the spacecraft has been manufactured and the insurance policy has been obtained, the satellite is launched onboard any of the launch vehicles available such as the Space Shuttle, Arian, Atlas, Delta, Titan, Long March, Sea Launch or Proton launch vehicles. If the satellite fails to reach its intended orbit but is otherwise functional, the guarantor funds and initiates the commencement of a recovery mission to move the satellite from the unintended orbit to an intended orbit. Preferably, the recovery mission includes the launch of an extension spacecraft within three months of the launch failure so that the satellite may be moved into its intended orbit as soon as possible to thereby minimize any affects on the non-operation of the satellite upon the satellite owner's business.

The cost of the recovery mission is entirely borne by the guarantor and thus the satellite owner benefits from the recovery mission by not having to wait two or more years to obtain a replacement satellite. Meanwhile, the recovery mission benefits the guarantor, even though the costs of the recovery mission must be borne by the guarantor, as the cost of the recovery mission is significantly lower than payment of the sum insured which would include the expense of a new replacement satellite and typically the expense of the additional satellite launch, as well as the expense of insurance for the replacement satellite and its launch.

Preferably, the original insurance policy also includes a provision protecting the satellite owner against failure of the recovery mission.

Other features and advantages of the present invention will be appreciated by those skilled in the art upon reading the detailed description which follows with reference to the attached drawings.

DETAILED DESCRIPTION OF THE INVENTION

Figure 1:
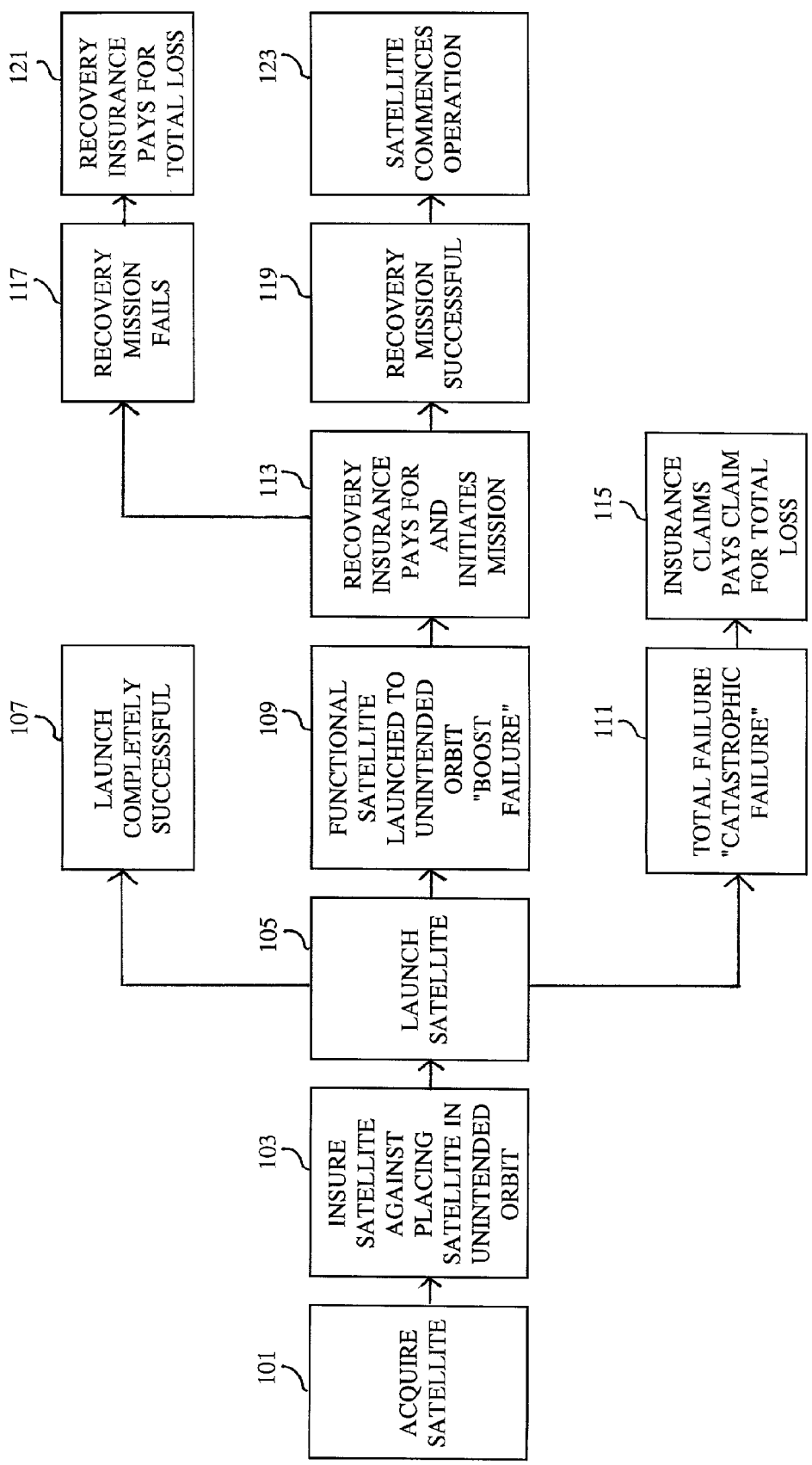
FIG. 1 is a flow chart illustrating the method of insuring against satellite launch failure of the present invention.

While the present invention is susceptible of embodiment in various forms, there is shown in the drawings and will hereinafter be described the presently preferred embodiments of the invention with the understanding that the present disclosure is to be considered as an exemplification of the invention and it is not intended to limit the invention to the specific embodiments illustrated.

With reference to FIG. 1, the present invention is directed to a method of obtaining launch insurance by a satellite owner to protect the satellite owner against accidental boost failures during satellite launch which place functional satellites in inoperable orbits. After purchasing a satellite 101 the owner typically obtains satellite insurance to cover any failure of the satellite either during launch or after orbit insertion. The satellite owner determines the amount of insurance to be purchased (the sum insured) which would typically cover the costs of satellite manufacture, satellite launch, launch insurance and other expenses to deploy the satellite. For purposes of the present invention, the satellite launch component is broken into two components. Insurance is obtained to cover launch risks including catastrophic failure of the launch vehicle, and failure of the satellite to reach its intended orbit due to a malfunction of the launch vehicle or booster vehicle. The failure of the satellite to reach its intended orbit is defined herein as "boost failure". The launch insurance also includes a recovery mission provision 103 to provide insurance coverage for the funding and initiation of a recovery mission in the event that the insured satellite is launched into an unintended orbit but otherwise fully functional. Thus, the satellite owner includes a recovery mission "reservation" within the launch insurance agreement entitling the satellite owner to a recovery mission at no cost in the event the satellite experiences a boost failure during launch and is deemed recoverable. Further, the Recovery Mission will be initiated much sooner than the time required to build and launch a new replacement satellite.

Still with reference to FIG. 1, after the satellite is launched 105, three scenarios are possible. In the majority of instances, the launch and orbital insertion of the satellite is completed entirely successfully 107. In this instance, the insurance payment has been made to the policy guarantor and the satellite owner takes control and operation of the orbital satellite. No further interaction between the satellite owner and guarantor is necessary. An alternative scenario, which occurs in approximately 6% of all satellite launches, results in catastrophic failure 111 of the satellite such as by an explosion of the launch vehicle or booster vehicle during launch or orbital transfer. In this instance, the guarantor must pay the satellite owner the sum insured in the insurance policy for total loss of the satellite 115.

In approximately 4% of all launches a booster failure 109 occurs resulting in a functional satellite being accidentally launched into an inoperable orbit. Where an insurance policy of the present invention has been obtained by the satellite owner, the guarantor pays for the initiation of a recovery mission 113 in an effort to transfer the satellite into an intended orbit. Where the recovery mission is successful, the satellite commences its intended operation such as providing communications, Earth observation or other scientific purposes 123.

In the unlikely event that the recovery mission fails 117 to properly transfer the satellite from its inoperable orbit to a correct and intended orbit, preferably the launch insurance policy provides for the satellite owner being completely compensated for the total loss of the satellite. In still an additional preferred embodiment of the invention, the launch insurance includes a recovery mission "reservation" provision which provides for the recovery mission being launched within three months after boost failure to minimize the satellite owner's risk due to the delay in the manufacture and launch of a recovery mission or launch of a replacement satellite.

The economics of the recovery mission insurance policy concept are based on the substantial difference between the total cost of a satellite recovered and the much higher total cost for the manufacture and launch of a replacement satellite. This difference in total cost can be utilized to benefit all parties involved including the satellite owner, the insurance underwriters and the insurance broker. The recovery mission "reservation" provision maximizes the probability of successfully delivering a satellite to its intended orbit, minimizes the satellite owner's market risk by initiating a recovery mission to expedite satellite revenue operations at the earliest opportunity, and minimizes the financial loss in the event of a boost failure.

Example 1

In a preferred practice of the present invention, launch insurance including a policy for providing a recovery mission is provided to the satellite owner at a cost less than the premium for obtaining conventional insurance.

On May 5, 1999, the Orion 3 communications satellite was launched into an unplanned orbit by the failure of the Centaur upper stage on the Boeing Delta III launch vehicle. According to public reports, the satellite was launched into an orbit of 85×744 nautical miles, far short of its specified launch insertion orbit of 100×13,886 nautical miles. On May 7, 1999, Orion 3 was transferred to an orbit of 228×711 nautical miles to prolong its life. The satellite appears to be fully functional but does not have sufficient onboard propellant to transfer it to its planned geostationary orbit of 22,300 nautical miles. The satellite and launch were insured for $265 million. It has been estimated that it would cost approximately $186.7 million to initiate a recovery mission employing an extension spacecraft to recover the Orion 3 satellite. This recovery mission costs includes full insurance at a cost of $58.3 million (at a 22% premium rate times sum insurance $265 million) to provide full compensation to the Orion 3 owner in the event the recovery mission were unsuccessful.

Figure 2:
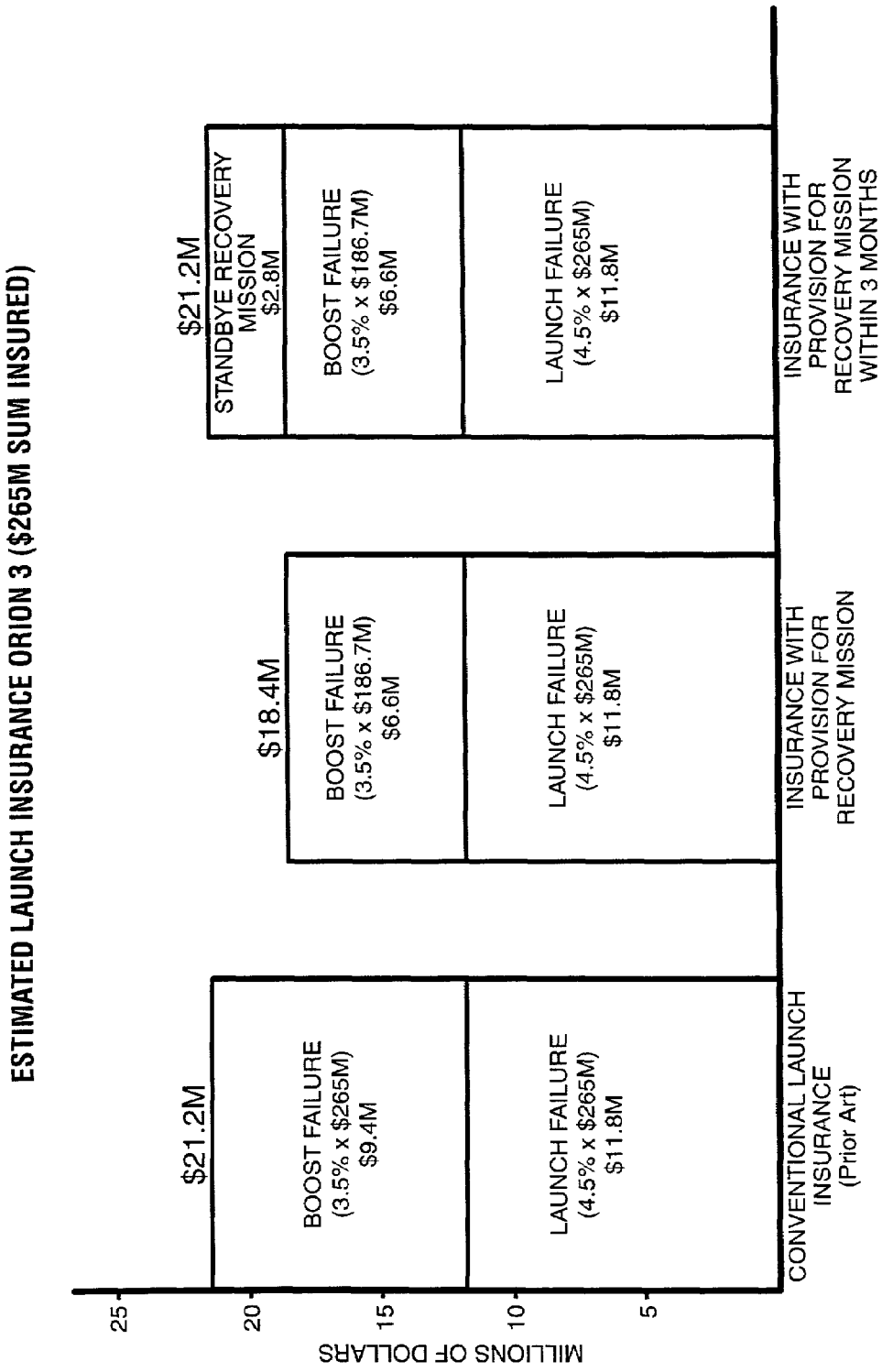
FIG. 2 is a bar chart illustrating the cost savings resulting from purchasing launch insurance including provision for a recovery mission of the present invention.

With reference to FIG. 2, conventional launch insurance may be divided into segments including separate premium rates for launch vehicle failure and boost failure. Thus, the launch of the Orion 3 at a premium rate of 8% would typically be divided into a launch vehicle failure premium rate of 4.5% and a boost failure premium rate at 3.5%. If conventional launch insurance were obtained, these rates would be multiplied by the sum insured of $265 million to establish segmented premiums of $11.8 million and $9.4 million, respectively, to provide a total premium of $21.2 million paid by the satellite owner.

However, if the satellite owner of Orion 3 had obtained launch insurance including provisions for a recovery mission, the insurance premium to cover boost failure would be reduced as the guarantor would not be required to pay the sum insured of $265 million, but instead would be required to pay for a recovery mission of $186.7 million in the event of a boost failure. Thus, the insurance premium to cover boost failure would amount to $6.5 million, significantly less than the $9.4 million required of conventional insurance. Thus, the insurance policy of the present invention including provision for a recovery mission would have lowered the insurance premium to the owner of Orion 3 by almost $3 million to $18.3 million.

In a preferred practice of the invention, the $2.8 million in insurance savings would have been paid to the company providing the recovery mission as payment to guarantee that a recovery mission would be conducted within a specified period of months of the satellite launch. For example, if the satellite owner of Orion 3 had obtained such a policy, the satellite owner would have paid $2.8 million to a company providing recovery missions to ensure that a recovery mission could be launched within, for example, three months of the satellite launch. The cost to the satellite owner of Orion 3 to obtain launch insurance including a recovery mission policy providing for a recovery mission to be launched within three months of boost failure would thus cost the exact same amount ($21.2 million) as conventional launch insurance.

Orion 3

Insurance Summary

|  | Rate (%) | Amount ($M) |
| --- | --- | --- |
| 1. Original Launch - Conventional |  |  |
| Sum Insured |  | 265.0 |
| Launch Phase Premium Rate (est) 8.0 |  |  |
| Launch Phase Premiums (estimate) |  |  |
| Launch Vehicle Failure | 4.5 | 11.8 |
| Boost Failure | 3.5 | 9.4 |
| Total Premium |  | 21.2 |
| 2. Recovery Cost |  |  |
| Recovery Mission (w/Profit %) |  | 128.5 |
| Insurance for RM |  |  |
| Sum insured |  | 265.0 |
| Premium Rate/Cost | 22.0 | 58.3 |
| Total Recovery Cost |  | 186.7 |
| 3. Original Launch with Reservation |  |  |
| Sum Insured |  |  |
| Launch Vehicle Failure |  | 265.0 |
| Boost Failure |  | 186.7 |
| Launch Phase Premium Rate | 8.0 |  |
| Launch Phase Premiums |  |  |
| Launch Vehicle Failure | 4.5 | 11.8 |
| Boost Failure | 3.5 | 6.6 |
| Total Premium w/Res |  | 18.4 |
| 4. Reservation Premium Residual (Savings) |  |  |
| Conventional Premium |  | 21.2 |
| Premium with Reservation |  | 18.4 |
| Standby Mission Premium |  | 2.8 |

Example 2

The following example is presented to illustrate a preferred practice of the invention including variables involved for a higher value satellite launched on a lower risk launch vehicle. This "satellite X" is ensured for $430 million and is launched on the Ariane 4 launch vehicle.

Satellite X

Insurance Summary

| Launch Vehicle: Ariane 4 |  |  |
| --- | --- | --- |
|  | Rate (%) | Amount ($M) |
| 1. Original Launch - Conventional |  |  |
| Sum Insured |  | 430.0 |
| Launch Phase Premium Rate (est) 4.5 |  |  |
| Launch Phase Premiums (estimate) |  |  |
| Launch Vehicle Failure | 2.5 | 10.8 |
| Boost Failure | 2.0 | 8.6 |
| Total Premium |  | 19.4 |

-continued

Launch Vehicle: Ariane 4

| | Rate (%) | Amount ($M) |
|---|---|---|
| 2. Recovery Cost | | |
| Recovery Mission (w/Profit %) | | 154.0 |
| Insurance for RM | | |
| Sum Insured | | 430.0 |
| Premium Rate/Cost | 22.0 | 94.6 |
| Total Recovery Cost | | 248.6 |
| 3. Original Launch with Reservation | | |
| Sum Insured | | |
| Launch Vehicle Failure | | 430.0 |
| Boost Failure | | 248.6 |
| Launch Phase Premium Rate | 4.5 | |
| Launch Phase Premiums | | |
| Launch Vehicle Failure | 2.5 | 10.8 |
| Boost Failure | 2.0 | 4.9 |
| Total Premium w/Res | | 15.7 |
| 4. Reservation Premium Residual (Savings) | | |
| Conventional Premium | | 19.4 |
| Premium with Reservation | | 15.7 |
| Standby Mission Premium | | 3.6 |

From the foregoing table, one can see that a savings of $3.6 million can be obtained by purchasing launch insurance including a recovery mission policy instead of purchasing conventional launch insurance. The $3.6 million dollars will be passed on to the satellite owner, insurance broker and insurance underwriters as either savings or additional profit. The conventional launch insurance would cost approximately $19.4 million including $10.8 million at a 2.5% premium rate and $8.6 million for a boost failure premium at 2.0% premium rate. Meanwhile, assuming a recovery mission cost of $248.6 million including an insurance premium of $94.6 million, the boost failure premium component of launch insurance including a recovery mission policy would be reduced by $3.6 million as the premium rate of 2.0% is multiplied by the recovery mission cost instead of the sum insured for the satellite.

The $3.6 million is preferably paid by the satellite owner as the part of the insurance premium to the insurance broker to provide the recovery mission as a "reservation" to conduct a recovery mission within three months of satellite launch if there is a boost failure. Again, the satellite owner is provided with a launch insurance policy including provision for a recovery mission within three months of a boost failure at the same cost of obtaining conventional launch insurance.

Example 3

In a non-preferred embodiment of the invention, the insurance policy for a recovery mission is offered to a satellite owner at a price in addition to the cost of a conventional launch insurance policy. As is explained in greater detail above, the premium for launch insurance including the recovery mission provision would more likely be less costly than conventional launch insurance. However, for purposes of simplicity and explanation, this example will describe an insurance policy of the present invention in which the recovery mission policy is paid for in addition to conventional launch insurance.

In March 1994 the U.S. Navy launched a military communications satellite UHF-1 on an Atlas I which suffered a boost failure. The estimated value for the satellite was $142 million with an additional $45.7 million for launch, for a total of $187.7 million. A 12% insurance rate was charged to the U.S. Navy resulting in a $22.5 million insurance premium.

Recovery mission insurance was not obtained by the U.S. Navy. However, the U.S. Navy most likely could have obtained such a policy at a rate of approximately 4% of the total value of the UHF-1 mission, or approximately $75 million. In a preferred practice of the invention, after it had been determined by the guarantor that the UHF-1 satellite was recoverable, the guarantor would have refunded the cost of all mission insurance premiums to the U.S. Navy as an incentive to the Navy to purchase the recovery mission policy thereby providing a refund to the U.S. Navy of $22.5 million. The U.S. Navy would have transferred all right, title and interest in the conventional insurance policy to the guarantor in order to exercise the recovery mission policy in which the guarantor would have paid for a fully insured recovery mission. In this example, the guarantor is essentially "buying the owner out" of its claims under the conventional insurance policy by refunding the insurance premiums and committing to the recovery mission.

On completion of a successful recovery mission, in which the satellite is delivered to its intended orbit, control of the satellite is delivered to the owner and the guarantor does not pay any additional claims. If the recovery mission is unsuccessful, the guarantor makes an additional payment to the satellite owner equal to the total value of the claims ($187.7 million) less the cost of the original recovery mission insurance premium ($22.5 million) which has already been refunded for a total claim payment of $165.2 million.

Meanwhile, where the guarantor has funded a recovery mission utilizing an extension spacecraft to transfer the satellite to its intended orbit, the entire recovery mission including insurance would have been completed for approximately $105.6 million (1994) dollars. The expenses for such a mission are set forth as follows.

| Element | Cost ($M) |
|---|---|
| Mission Cost | |
| Launch (Atlas I, UHF-1 relaunch guaranty) | 45.7 |
| Spacecraft (Option B, Feasibility Analysis) | 18.6 |
| Subtotal | 64.3 |
| Insurance | |
| Launch (@22% of Satellite Insured Sum) | 41.3 |
| Total Cost | 105.6 |

Neither the U.S. Navy nor the guarantor would have been exposed to any additional financial loss due to the initiation of the recovery mission. The U.S. Navy would have obtained the opportunity to take possession of a fully functional satellite in an intended orbit long before an additional satellite could be launched. Moreover, where the mission was successful, the original guarantor would have spent significantly less money on funding a recovery mission than having to pay for total compensation of the UHF-1 satellite and launch. Conversely, even if the recovery mission was unsuccessful, the U.S. Navy would have been compensated for the full amount of the satellite and launch and the original guarantor would have been protected against failure of the recovery mission by obtaining recovery mission failure insurance which would have provided compensation sufficient to cover an insurance payment to the satellite owner of the sum insured.

Recovery Missions

The recovery missions may take various formats. For example, the satellites may be recovered by being returned to Earth such as within the Space Shuttle for refurbishment and relaunch into an intended orbit. In the alternative, the recovery mission may include the manual attachment of a transfer vehicle to the satellite, such as the attachment of a solid rocket motor, and the remote firing of the motor to transport the satellite to an intended orbit. However, for purposes of practicing the present invention it is preferred that the recovery mission include the launch and operation of an unmanned extension spacecraft.

Figure 3:
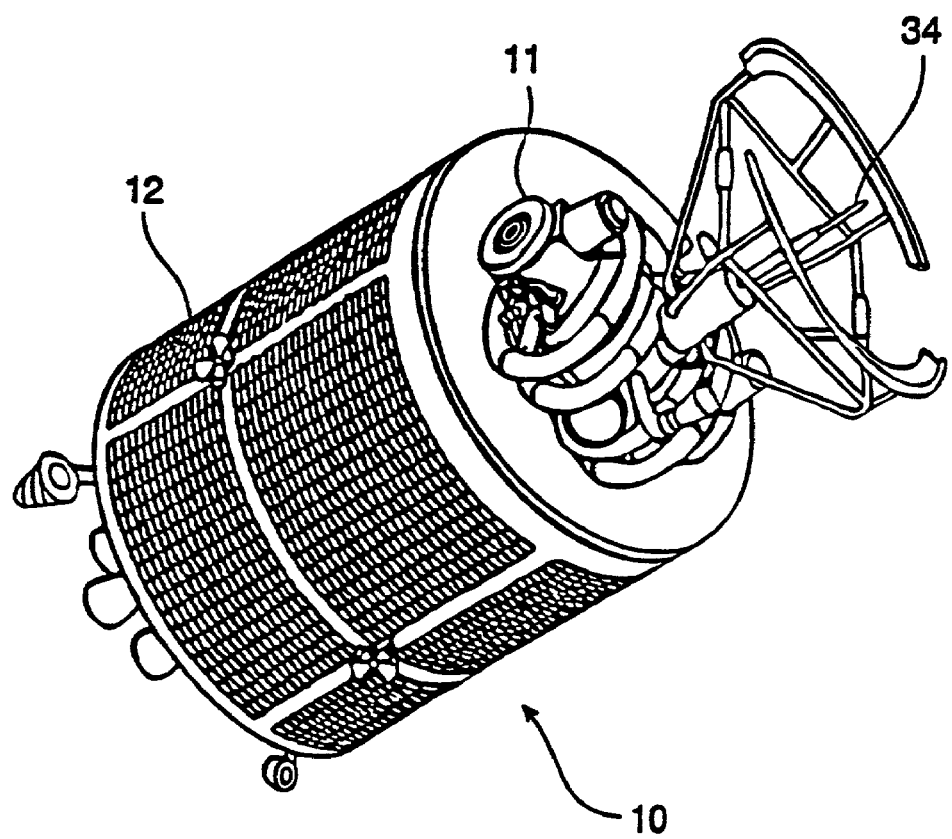
FIG. 3 is a perspective view of an extension spacecraft, configured to provide a recovery mission.
Figure 4:
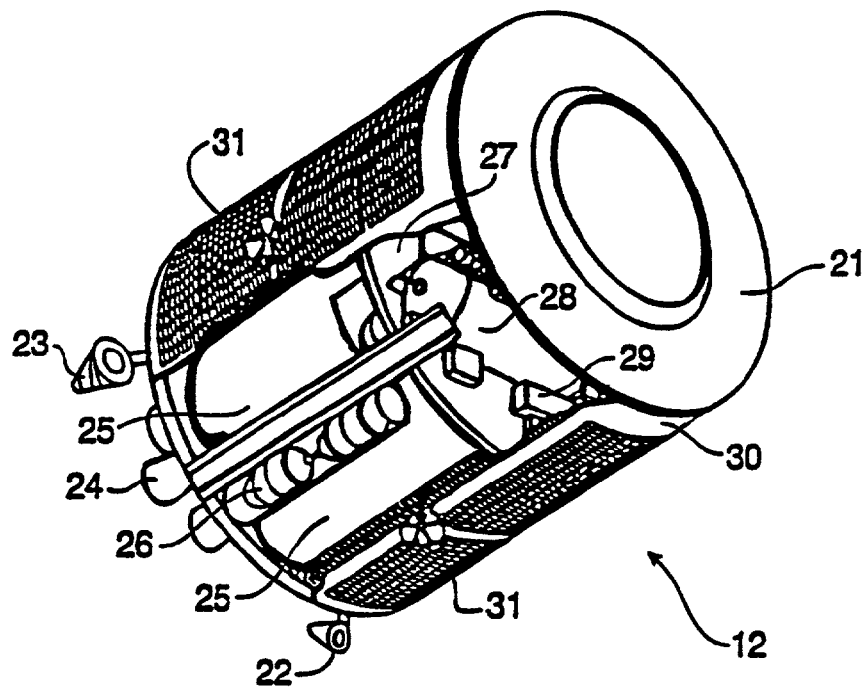
FIG. 4 is a partially cut-away perspective view of the service module of the extension spacecraft of FIG. 3.
Figure 5:
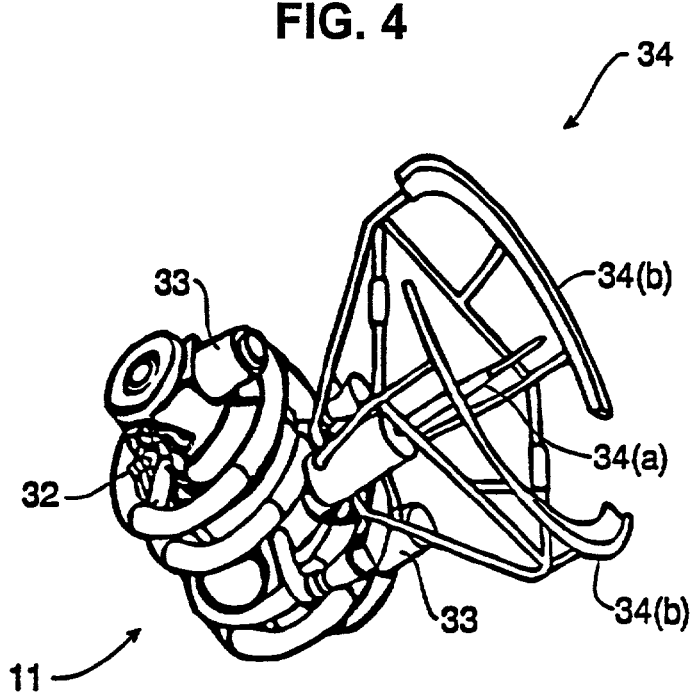
FIG. 5 is a perspective view of the command module of the extension spacecraft of FIG. 3.
Figure 6A:
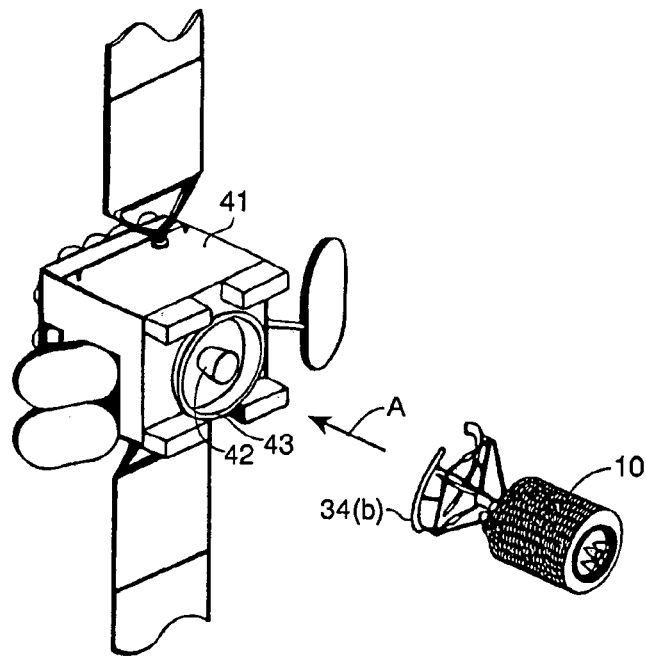
FIG. 6 illustrates the docking maneuvers and mechanical interconnection of the extension spacecraft with a target satellite.
Figure 6B:
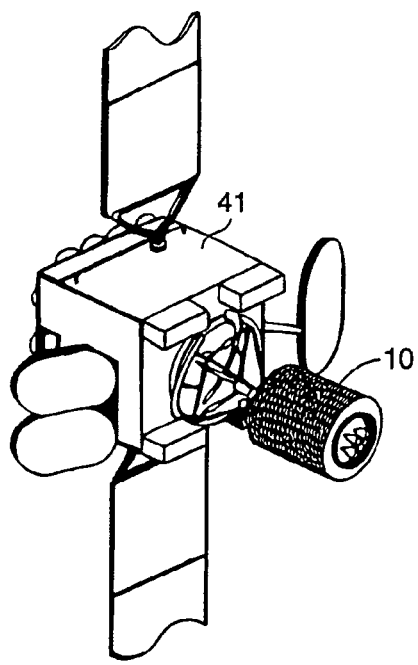

Turning now to the drawings, FIGS. 3-5 illustrate an extension spacecraft constructed in accordance with and used in accordance with the principles of the present invention. The spacecraft 10 comprises a command module 11 and a service module 12. The extension satellite embodies exoatmospheric construction and is adapted to be carried into space, e.g., to a rendezvous phasing orbit or low Earth orbit in the enclosed cargo bay or within the enclosing shroud of an earth launch vehicle (ELV) such as, for example, the Delta or the Space Shuttle, depending on mission requirements, availability, cost, etc. For example, in one embodiment of the invention, the baseline earth launch vehicle is the Delta 7920, which has a low earth orbit payload insertion capability of approximately 5,000 kilograms and a geosynchronous transfer orbit capability of approximately 1,300 kilograms.

The service module 12 operates as a "space bus" for the command module 11, providing among other functions, propulsion, power and communications support, thus minimizing the requirements for corresponding subsystems in the command module 11. The operations phase design lifetime of the command module 11 for in-space servicing can therefore be relatively short, based on specific programmed tasks at the target vehicle during a fixed period of activity. If necessary, the command module 11 will separate from the service module 12 and operate independently. Also, for certain missions, a satellite transfer vehicle (STV), such as that disclosed in my issued U.S. Pat. No. 5,242,135, can be employed to transfer the extension spacecraft 10 from the launch insertion orbit to a rendezvous phasing orbit (RPO).

As will be apparent to those skilled in the art, all of the functions of the command module 11 could be incorporated into the service module 12, although the separate command and service modules herein described provide for maximum mission flexibility and are, accordingly, a presently preferred embodiment of the invention.

Referring more particularly to FIG. 4, the primary purpose of the service module 12 is to augment the propulsion capabilities of the command module 11. For example, if the command module 11 is configured as a variant of the SDIO Lightweight Exoatmospheric Projectile (LEAP) Vehicle, the service module 12 can be based on the design of the existing "Small Altimeter" (SALT) satellite manufactured for the United States Navy by Intraspace, Inc., North Salt Lake City, Utah. The service module 12 includes a command module adapter ring 21, GPS antenna 22, S-Band OMNI antenna 23, orbit insertion motors 24, propellant tanks 25, batteries, 26. Mounted on the mid-deck 27 is a reaction control system 28 and on-board processor 29. These components are enclosed by a monocoque structure 30, on which are mounted solar power cell arrays 31.

The service module 12 is sized to perform all rendezvous and proximity maneuvers, as well as specific transfer maneuvers required for the extension spacecraft-target satellite docked combination. For certain target spacecraft locations, the energy requirements to position the extension spacecraft for rendezvous may be greater than that available from the service module 12, for example, an inclination change for the target satellite. In such cases, the STV would be added to the extension spacecraft 10 to augment the propulsion capabilities of the service module 12.

For major maneuvers, the service module 12 is equipped with a storable biopropellant system consisting of a "quad" array of four uprated Marquardt R-4-D 490 Newton (100 lb.) thrust axial engines. This configuration provides adequate thrust-to-weight ratio to minimize the effects of non-impulsive maneuvers, as well as redundancy for engine-out capability to complete the mission. Marquardt R-4-D engines are selected for their very high reliability, high Isp (322 seconds), maturity (over 800 produced) and availability.

To prevent contamination of the target satellite when the extension spacecraft is stationkeeping, the extension spacecraft attitude control system is a nitrogen cold gas system consisting of 16×5 lb. thrusters mounted in quads on the circumference of the service module 12. This configuration enables both three-axis rotation and three-axis translation for example, for stationkeeping and docking.

Referring more specifically to FIG. 3, the command module 11 includes several major subsystems, including guidance, navigation and control (GNC) system used for all extension spacecraft operations, a main propulsion system with "divert" thrusters of approximately 100 lbs. (490 N) thrust each, an attitude control system, and data and communication subsystems. The command module payload consists of a "seeker" subsystem with sensors for target location, tracking and inspection, and a docking system with various servicing devices such as a docking apparatus or robotic arms with clamps or grippers.

The basic configuration of the command module 11 is defined as a completely independent vehicle to enhance mission planning flexibility, minimize interface requirements, maximize the use of existing or developmental small spacecraft, and enable independent testing and verification of certain proximity operations and hardware in ground facilities prior to launch. The command module 11 may remain attached to the service module 12 (as for the UHF-1 recovery mission, described below), or it may be detached to operate autonomously. The service module 12 could, therefore, carry two or more command modules 11. In such configuration, the service module 12 acts as the primary spacecraft and the command module or modules can be detached for use as observation spacecraft. In either case, prior to separation of the command module(s) 11, certain rendezvous braking maneuvers would be performed by the divert thrusters of the combined command module-service module.

The baseline design command module 11 consists of a variant of the SDIO LEAP with minor modifications. The Rocketdyne AHIT Vehicle is selected as the baseline command module 11. This vehicle has completed several full-up hover tests in the SDIO National Hover Test Facility. In current configuration it weighs 10.2 kilograms, including 1.7 kilograms of propellant. It produces a delta velocity increment of 357 m/sec.

In this configuration, the command module includes cold gas attitude control system thrusters 32 and two divert thrusters 33 which have significantly higher thrust (490 N, 100 lb.) than the service module engines (5 lb.). These divert thrusters 33 are aligned along the line of sight from the service module 12 toward the target satellite. These divert thrusters 33 would not be used in close proximity to the target satellite to preclude contamination of the satellite. The remaining two divert thrusters of the AHIT vehicle are removed.

This forward alignment of the divert thrusters enables the seeker assembly to be continuously oriented toward the target satellite, thus precluding the necessity of rotating the extension spacecraft 180 degrees opposite to the target line of site to perform braking maneuvers. Although the engines 24 of the service module 12 could be used to perform braking, the low thrust level of these engines (20 lbs. total) would result in much longer burn times and very narrow margins in ignition time, burn durations, orbital position, and relative velocity.

Figure 7:
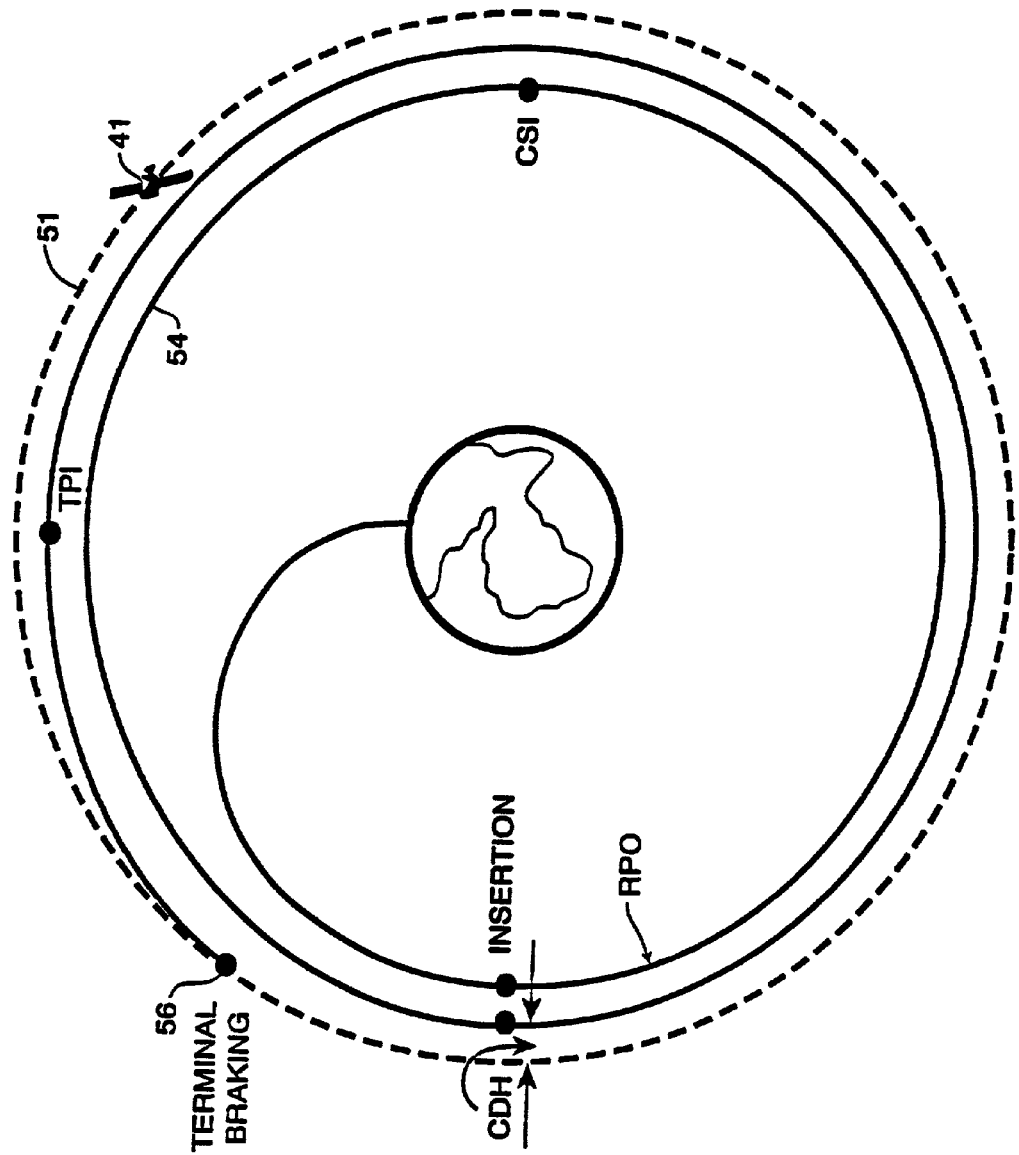
FIGS. 7-9 illustrate a typical mission scenario performed by an extension spacecraft to transfer a satellite from an unintended inoperable orbit to an intended operational orbit.
Figure 8:
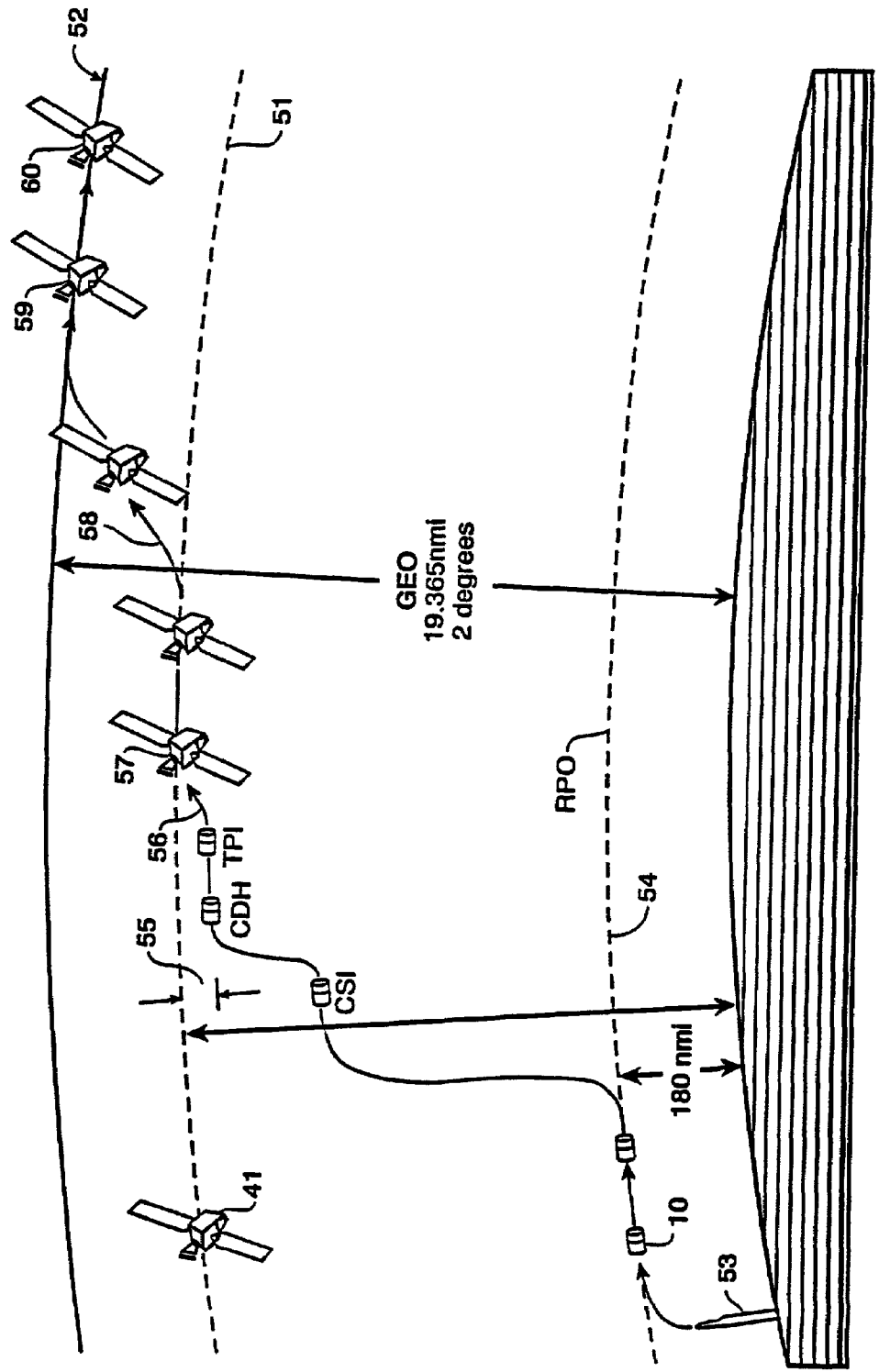
Figure 9:
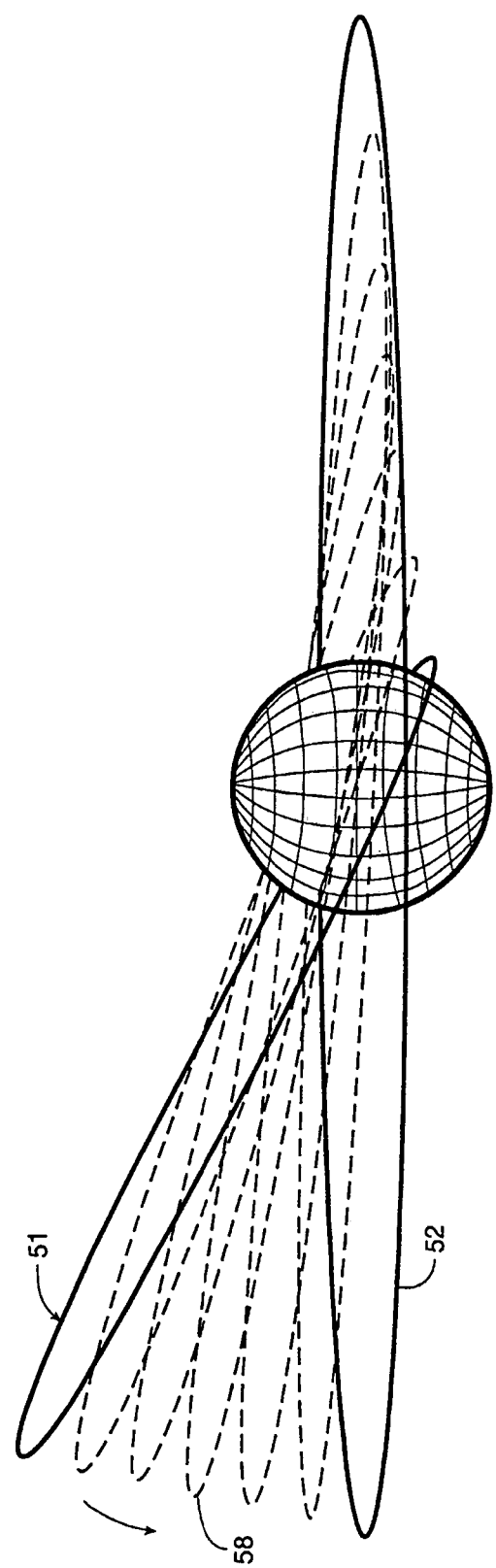

FIGS. 7-9 illustrate a typical recovery mission scenario. Illustratively, this scenario envisions the recovery of the Navy UHF-1 satellite which was launched into a non-operational orbit on Mar. 29, 1993, by a degraded launch vehicle. Subsequently, the Navy stated that the UHF-1 satellite is a total loss. The UHF-1 satellite 41 is in essentially a geosynchronous transfer orbit 51 with a perigee at 118 nm, apogee at 19,365 nm and an inclination at 27 degrees. The recovery flight profile depicted in FIGS. 7-9 is designed to transfer the satellite 41 into geostationary orbit (GEO) 52 by circularizing the orbit and reducing its inclination to approximately zero degrees.

To accomplish the recovery mission, the extension spacecraft 10 is launched from the Earth by an Earth launch vehicle 53, into a Rendezvous Phasing Orbit (RPO) 54 with a perigee of 180 nm, an apogee of approximately 19,345 nm and an inclination of 27 degrees. After insertion of the extension spacecraft 10 into RPO, a four-impulse sequence is initiated which consists of coeliptic sequence initiation (CSI), constant delta height (CDH), terminal phase initiation (TPI) and braking. CSI establishes a deextentioned ratio of relative height to phase angle between the extension spacecraft 10 and the target satellite 41. CSI also establishes, based on subsequent maneuvers, the standard lighting conditions as well as transfer time for the final approach to the target 41. CDH establishes a constant differential altitude between the extension spacecraft 10 and the target satellite. TPI establishes an extension spacecraft trajectory that will intercept the target satellite 41 at a specific time and position on the orbit 52 of the target satellite. A nominal transfer interval of 130 degrees is used to optimize propellant usage, provide adequate control authority during the final approach, insure the apparent inertial motion of the target satellite 41 (relative to the star field) as near zero during the latter part of the intercept, and insure that the transfer is along the line of sight. Braking is performed as a series of distinct maneuvers performed at specific range/rate "gates", each of which occurs at a range from the target where the actual range/rate is reduced to a preplanned value. The maneuvers at these gates gradually reduce the relative velocity between the vehicles to zero. After docking of the extension spacecraft 10 with the target satellite 41, the docked combination 57 then perform a series of maneuvers to cause the perigree of the docked combination 58 through intermediate orbits (indicated by the dash lines on FIG. 9) to raise the perigree to 19,365 nm and reduce the inclination to near zero, placing the docked combination in final operational orbit (GEO) 52.

The use of an extension spacecraft to perform a recovery mission provides a relatively inexpensive and reliable means of transferring a satellite from an unintended orbit to an operable intended orbit. By providing the guarantee of a recovery mission including the use of an extension spacecraft within launch insurance reduces the business risk to the satellite owner and maximizes the probability of successfully delivering the satellite to its intended orbit. Launch insurance including provision for a recovery mission also reduces the risk to the guarantor of having to pay total compensation of the sum insured in the event of a launch failure.

Having described my invention in such terms as to enable those skilled in the art to understand and practice it, workers skilled in the art will recognize that changes may be made in form and detail without departing from the spirit and scope of the invention.

I claim:

1. A method of insuring against satellite launch failure including rescue reservations comprising the steps of:
    purchasing a satellite for orbiting the earth;
    obtaining a launch insurance policy prior to launching the satellite from Earth, wherein the launch insurance policy including a rescue mission provision from a guarantor covering the launch of the satellite into an unintended orbit, the rescue mission provision providing for the payment to a rescue mission provider of a rescue mission in the event that the satellite is launched into an unintended orbit but otherwise remains functional, the rescue mission provision specifying that the rescue mission shall include 1) providing a extension spacecraft having guidance, navigation and control systems for position control of the extension spacecraft and satellite combination and having an onboard propellant supply sufficient for moving the extension spacecraft and satellite combination from one orbit to another orbit, 2) launching the extension spacecraft into space, 3) mechanically connecting the extension spacecraft to the satellite launched into an unintended orbit, and 4) utilizing the extension spacecraft's guidance, navigation and control systems and onboard propellant supply to move the satellite from the unintended orbit to an intended operational orbit;
    triggering the rescue mission provision in the event that the satellite is launched into an unintended orbit but the satellite otherwise remains functional;
    calculating the rescue mission costs;
    paying a rescue mission provider for a rescue mission by the guarantor in accordance with the launch insurance policy; and
    initiating the rescue mission for moving the satellite from the unintended orbit to an intended operational orbit, comprising the additional steps of:
        providing a extension spacecraft having guidance, navigation and control systems for position control of the extension spacecraft and satellite combination and having an onboard propellant supply sufficient for moving the extension spacecraft and satellite combination from one orbit to another orbit;
        launching the extension spacecraft into space;
        moving the extension spacecraft to within proximity of the satellite launched into an unintended orbit;
        mechanically connecting the extension spacecraft to the satellite launched into an unintended orbit; and
        utilizing the extension spacecraft's guidance, navigation and control systems and onboard propellant supply to move the satellite from the unintended orbit to an intended operational orbit.

2. The method of insuring against satellite launch failure of claim 1 wherein the extension spacecraft is unmanned.

3. The method of insuring against satellite launch failure of claim 1 further comprising the steps of:
    obtaining a rescue mission failure insurance policy from a guarantor which provides for financial compensation to the policy holder in the event of failure of the rescue mission to move the satellite from an unintended orbit to an intended orbit.

* * * * *

UNITED STATES PATENT AND TRADEMARK OFFICE
CERTIFICATE OF CORRECTION

PATENT NO. : 7,587,325 B1
APPLICATION NO. : 09/713965
DATED : September 8, 2009
INVENTOR(S) : David R. Scott It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1096 days.

Signed and Sealed this

Twenty-first Day of September, 2010

David J. Kappos
*Director of the United States Patent and Trademark Office*